United States Patent [19]

Tran

[11] Patent Number: 4,987,542
[45] Date of Patent: Jan. 22, 1991

[54] ARRANGEMENT FOR DETERMINING THE EFFECTS OF CROSS WINDS ON VEHICLES

[75] Inventor: Van T. Tran, Stuttgart, Fed. Rep. of Germany

[73] Assignee: Daimler-Benz AG, Fed. Rep. of Germany

[21] Appl. No.: 350,348

[22] Filed: May 11, 1989

[30] Foreign Application Priority Data

May 11, 1988 [DE] Fed. Rep. of Germany ....... 3816057

[51] Int. Cl.$^5$ ............................................. B62D 5/00
[52] U.S. Cl. .................................. 364/424.05; 73/182;
73/861.66; 180/903
[58] Field of Search ...................... 364/424.01, 424.05,
364/424.06, 425, 432, 434, 558; 180/903, 141,
142; 73/182, 861.65, 861.66

[56] References Cited

U.S. PATENT DOCUMENTS

| 4,378,697 | 4/1983 | DeLeo et al. ............... 73/861.65 |
| 4,745,565 | 5/1988 | Garwin et al. ............... 364/558 |
| 4,810,022 | 3/1989 | Takagi et al. ............... 364/424.05 |
| 4,834,205 | 5/1989 | Mizuno et al. ............... 364/424.05 |
| 4,836,019 | 6/1989 | Hagen et al. ............... 73/182 |

FOREIGN PATENT DOCUMENTS 1108091 12/1961 Fed. Rep. of Germany.

OTHER PUBLICATIONS

"Aerodynamic derivatives on vehicle stability passing through crosswind". ISATA—Proc., Sep. 1987, Int. Symposium on Automotive Technol. and Automation.

Primary Examiner—Gary Chin
Assistant Examiner—Tyrone Queen
Attorney, Agent, or Firm—Evenson, Wands, Edwards, Lenahan & McKeown

[57] ABSTRACT

At a vehicle, pressure probes are arranged, which generate signals from which differences and differential quotients are formed. As a result, quantities may be generated by a computer which reflect the angle of incidence as well as the ram pressure of the cross wind on the vehicle.

12 Claims, 3 Drawing Sheets

ARRANGEMENT FOR DETERMINING THE EFFECTS OF CROSS WINDS ON VEHICLES

BACKGROUND AND SUMMARY OF THE INVENTION

The invention relates to an arrangement for determining the effects of cross winds on vehicles, particularly motor vehicles or the like, having several pressure probes which are arranged symmetrically with respect to a vertical central longitudinal plane of the vehicle, are spaced away from one another in a longitudinal direction of the vehicle, and are connected with the input side of a computer which analyzes the measured pressure values.

German Pat. Specification (DE-PS) 11 08 091, teaches to arrange one pressure sensor respectively on two opposite sides of a vehicle for sensing air pressure influenced by cross winds. Each pressure sensor is connected with a control element, which responds to the differential pressure and controls steering motions of the vehicles which are directed against the cross winds to compensate for the influence of the cross winds on the vehicle.

Although this arrangement recognizes that pressure differences occur between the vehicle sides as a result of cross winds, it was found to be impossible in practice to actuate the steering for the compensation of the cross wind effects solely as a function of these pressure differences.

In the text "ISATA-Proc. 87057 (1987) 16th Int. Symposium on Automotive Technol. and Automation (Florence 1987), Proc. Vol. 2", Page 233-243, it is described how wind effects on a motor vehicle can be determined directly during test drives. For this purpose, a plurality of pressure transducers are arranged on both longitudinal sides of the vehicle as well as at the vehicle front end and the vehicle rear end, in order to determine the air pressure at the respective measuring points during the driving operation of the vehicle. Utilizing a computer, which analyzes the measured values, the aerodynamic forces affecting the vehicle can then be determined. In particular, it can be determined how large the moments are which seek to influence the vehicle in the sense of a pitching motion or rolling motion and how large the side force is which seeks to press the vehicle sideways in cross wind.

It is the main purpose of this known arrangement to determine the aerodynamic characteristics of motor vehicle bodies during test drives on a test site. The information derived in this manner can be used to supplement, or to obviate the need for, data from tests with models of the motor vehicle in wind tunnels.

However, this text does not contain any information as to how data concerning the wind velocity and/or the wind direction may be supplied to the driver of a motor vehicle during the driving operation.

Accordingly, it is an object of the present invention to provide an arrangement, for determining information indicative of the wind velocity as well as the direction of a cross wind on the vehicle which can be constructed at a comparatively low cost in terms of both labor and equipment expenditure.

According to advantageous preferred embodiments of the present invention, these and other objects are achieved in that a computer generates a signal representative of the wind direction relative to the vehicle utilizing a quotient value which is formed from the difference of the signals generated by a first probe on one vehicle side and of a second probe on the other vehicle side arranged asymmetrically with respect to the first probe and from the difference of the signals of the probes which are arranged symmetrically with respect to the two above-mentioned probes. The computer also generates a signal representative of the ram pressure, in that the difference of the signals of two probes arranged asymmetrically with respect to one another on different vehicle sides is functionally related with a factor which is given or can be determined and which is dependent on the signal representative of the wind direction.

When determining the wind direction, a preferred embodiment of the present invention advantageously utilizes the recognition that a vehicle (which, in a conventional manner, is shaped symmetrically with respect to a vertical central longitudinal plane), when cross winds are present, is surrounded by fluid flow asymmetrically with respect to the vertical central longitudinal plane. At the same time, the surprising recognition is utilized that this asymmetry of fluid flow and thus the angle of incidence of the cross winds relative to the vehicle can be determined sufficiently precisely utilizing only a few probes which are arranged in the indicated manner.

In addition, when determining the ram pressure, i.e., an essential quantity of the cross wind which is predominantly dependent only on the wind velocity, the unexpected realization is utilized that a determination of the ram pressure is possible from a pressure difference which can be measured by means of two pressure probes merely if correction factors are known which are correlated with the angle of incidence of the cross wind relative to the vehicle. These correction factors may be determined empirically for each respective vehicle shape by means of wind tunnel experiments.

As a function of the angle of incidence as well as of the ram pressure of the cross wind, the computer, if necessary, can influence a steering or also aerodynamic devices or the like of the vehicle in order to compensate for the effect of the cross wind or to make it more manageable for the driver.

An advantageous feature of preferred embodiments of the present invention is that it is possible to react very rapidly to the cross wind, because the disturbance variable, i.e., the angle of incidence as well as the ram pressure of the cross wind, can be taken into account due to the realizatin that the ram pressure is functionally related with the angle of incidence of the cross wind. As a result, a particularly steady vehicle handling is ensured.

In principle, it is also possible to reduce the effects of cross winds by way of a disturbance variable deviation control, in which case, for example, yaw velocity sensors are used in the vehicle in order to register its rotation around a vertical axis of the vehicle. If the steering angle and the vehicle reaction do not coincide, a control system intervenes in the steering, possibly in a rear wheel steering, in order to minimize the deviation. However, in contrast to the system according to preferred embodiments of the present invention, deviations from the course must first take place as the result of the cross wind, before a correction can be effective. The preferred embodiments of the present invention, in contrast, permit an anticipating correction.

According to a preferred embodiment of the invention, the pressure probes are, in each case, arranged interiorly spaced from a body shell of the vehicle at an opening or bore which leads to the outside, the diameter or cross-section of which may be quite small. For example, bores with a diameter of about 3 mm are sufficient.

With a view to a higher measuring precision, it is extremely expedient and advantageous for the pressure probes, to each be connected, by means of pipes or hoses or the like, to a common reference space and to generate signals which are a function of the pressure difference between the surroundings of the probe and the reference space. Thus, each pressure probe practically represents a differential-pressure gauge. This type of an arrangement is possible because, in the case of the system according to preferred embodiments of the present invention, to determine both the angle of incidence as well as the ram pressure of cross winds only the relative differences between the pressure values measured, in each case, by two pressure probes or the signals emitted by two pressure probes, must be measured or determined as essential quantities. Thus the pressure level in the reference space has no influence on the precision of the system. The pressure in the reference space may even fluctuate with respect to time. However, fast pressure fluctuations in the reference space should be avoided, because, as a result, turbulences or pressure waves may arise in the connecting lines between the pressure probes and the reference space which affect the different pressure probes at different times and thus falsify the quantities to be determined. For this reason, it is, as a rule, expedient to connect the reference space with the atmosphere by a throttle path in order to reduce the rapidity of pressure changes in the reference space.

In addition, for example, in the case of motor vehicles, a hollow space in the body can be connected with the pressure probes as a reference space.

With a view to a high measuring precision, it is also advantageous for the pressure probes to be arranged such that the signals of each probe, during wind in a longitudinal direction of the vehicle, are large in amount and approximately proportional to the ram pressure. In the case of a constant wind velocity, at least in an angular area of the wind directions it is advantageous if the signals generated by the probes are dependent clearly on the wind direction. A position of the pressure probes which is optimal in this respect may be determined empirically by wind tunnel experiments.

In order to determine the angle of incidence of cross winds impinging at the front of the vehicle at angles up to 75° with respect to the longitudinal axis of the vehicle, it is sufficient to arrange two front and two lateral pressure probes at the vehicle. If arbitrary directions of incidence are to be taken into account, two additional lateral pressure probes are to be provided. In this latter arrangement, it is advantageous, in the case of a passenger car, for the additional lateral pressure probes to be arranged approximately at the lateral vehicle center and for the above-mentioned lateral pressure probes to be arranged close to the forward vehicle corners. Also for the front-end pressure probes an arrangement close to the corners is usually advantageous.

Even if a total of six pressure probes are provided for the correlated values of the wind incidence angle and the ram pressure, only values from four of the six pressure probes are required to determine the wind incidence angle and ram pressure in each case. So that the computer takes into account the respective appropriate pressure probes, it is preferably provided that the signals of both symmetrically arranged front-end probes as well as two symmetrically arranged lateral probes are processed to determine the desired values when the difference between the signal of the front-end probe on one vehicle side and the signal of the other front-end probe has the same preceding sign as the difference between the signal of one lateral probe on one vehicle side and the signal of the respective symmetrically arranged lateral probe. If the two differences have an opposite preceding sign, the signals of the four lateral probes are utilized.

Other objects, advantages and novel features of the present invention will become apparent from the following detailed description of the invention when considered in conjunction with the accompanying drawings.

DETAILED DESCRIPTION OF THE DRAWINGS

Figure 1:
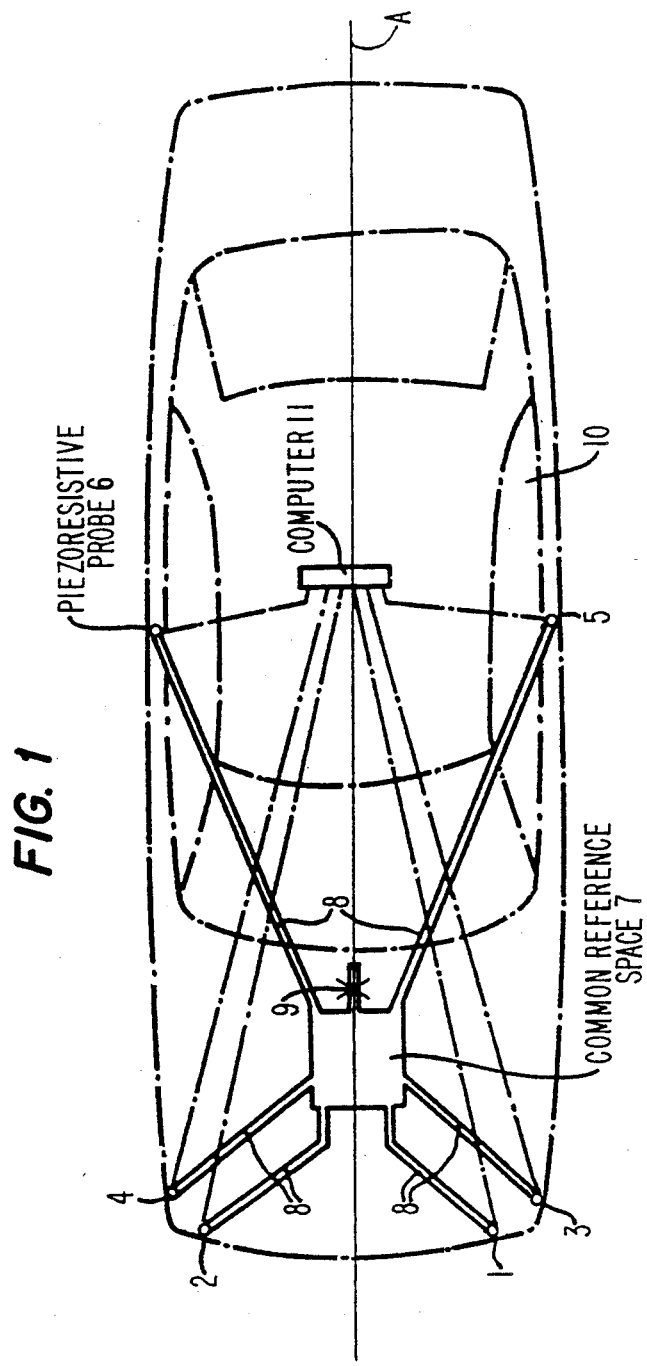
FIG. 1 is a schematic top view of a passenger car with an arrangement according to a preferred embodiment of the present invention for determining the effects of cross winds.

Two front-end pressure probes 1 and 2 are arranged at the passenger car 10 as shown in FIG. 1, which are symmetrical with respect to a vertical central longitudinal vehicle plane A, as well as two or, preferably, four lateral pressure probes 3 to 6 which are also symmetrical with respect to the vertical central longitudinal plane A. In this case, the lateral pressure probes 3 and 4 as well as the front-end pressure probes 1 and 2 are located close to the forward body corners. The pressure probes 5 and 6 are arranged approximately in the center of the side of vehicle, for example, close to the B-column which is housed between the front and rear side doors.

All pressure probes are housed preferably spaced from under the body shell of the vehicle, in each case, behind a small opening, the diameter of which is of a magnitude of about 3 mm. Each of the pressure probes 1 to 6 is constructed as a differential pressure gauge, which, in each case, reacts to the pressure difference between the pressure at the body shell of the vehicle 10 and the pressure in a reference space 7 which is connected with the pressure probes 1 to 6 by pipe or hose lines 8. Practically any hollow space of the vehicle body may be used as a reference space 7, since the pressure in the reference space does not have to remain constant. It must be ensured that no rapid pressure fluctuations occur in the reference space 7 which, as a result of turbulences or pressure waves, may result in pressure fluctuations at the pressure probes 1 to 6 which occur at different times. In order to ensure slow pressure fluctuations with respect to time, the reference space 7 is preferably connected with the atmosphere by a throttle path 9.

The signal outputs of the pressure probes 1 to 6 are connected with the input side of a computer 11 of the vehicle 10. The computer, in turn, which can control steering corrections of the vehicle or aerodynamic devices for the compensation of the cross-wind effects, as a function of the cross-wind effects, which are determined by pressure probes 1 to 6. For example, in the case of vehicles with additional rear-wheel steering, it is possible for the computer to contral control elements of a rear wheel steering system for the compensation of the cross-wind effects.

The arrangement according to a preferred embodiment of the present invention operates as follows:

If the vehicle only has pressure probes 1 to 4, only such cross winds are detectable which affect the vehicle diagonally from the front and relative to the longitudinal axis A of the vehicle at an angle of up to approximately −75° (from the right) or up to about +75° (from the left).

If all six pressure probes 1 to 6 are present, cross winds are detectable from any directions; i.e., the direction of incidence may form an angle of up to +180° and up to −180° with the longitudinal axis A of the vehicle.

In the following, the operation of an embodiment of the invention employing a total of six pressure probes will be described. To the extent that the measured values of pressure probes 5 and 6 are used, these are operations which cannot be carried out by a system having only four pressure probes 1 to 4; i.e., that type of a system would be unable to determine the respective cross-wind effect, because the measuring range is exceeded.

First, signals $p_1$ to $p_6$ of pressure probes 1 to 6 are acquired by the computer 11.

Then the computer 11 determines the pressure differences $p_{12} = p_1 - p_2$, $p_{34} = p_3 - p_4$, $p_{14} = p_1 - p_4$, $p_{23} = p_2 - p_3$ and $p_{56} = p_5 - p_6$.

Then the computer examines whether the pressure difference $p_{56}$ and/or the pressure difference $p_{34}$ are positive or negative. If these pressure differences have a positive value, the preceding sign of the angle of incidence is positive; i.e., the cross wind, viewed in driving direction, approaches from the left. When the preceding sign is negative, the corresponding situation applies; i.e., the cross wind comes from the right.

Then it is examined whether the pressure difference $p_{12}$ has the same preceding sign as the pressure difference $p_{34}$ and/or the pressure difference $p_{56}$. If the preceding signs are the same, the angle of incidence is between approximately −75° and +75°. If the preceding signs are not the same, the angle of incidence has values between +75° and +180° or between −75° and −180°.

If the angle of incidence is between 0 and +75°, the computer 11 determines the differential quotient $D_{2314} = p_{23}/p_{14}$.

If the angle of incidence is between 0 and −75°, the computer 11 determines the differential quotient $D_{1423} = p_{14}/p_{23}$.

If the angle of incidence is between +75° and +180°, the computer 11 determines the differential quotient $D_{3456} = p_{34}/p_{56}$.

If the angle of incidence is between −75° and −180°, the computer 11 also determines the differential quotient $D_{3456} = p_{34}/p_{56}$.

It is assumed that in the present case, the angle of incidence was between 0 and −75°, so that the computer 11 determined the differential quotient $D_{1423}$.

Figure 2:
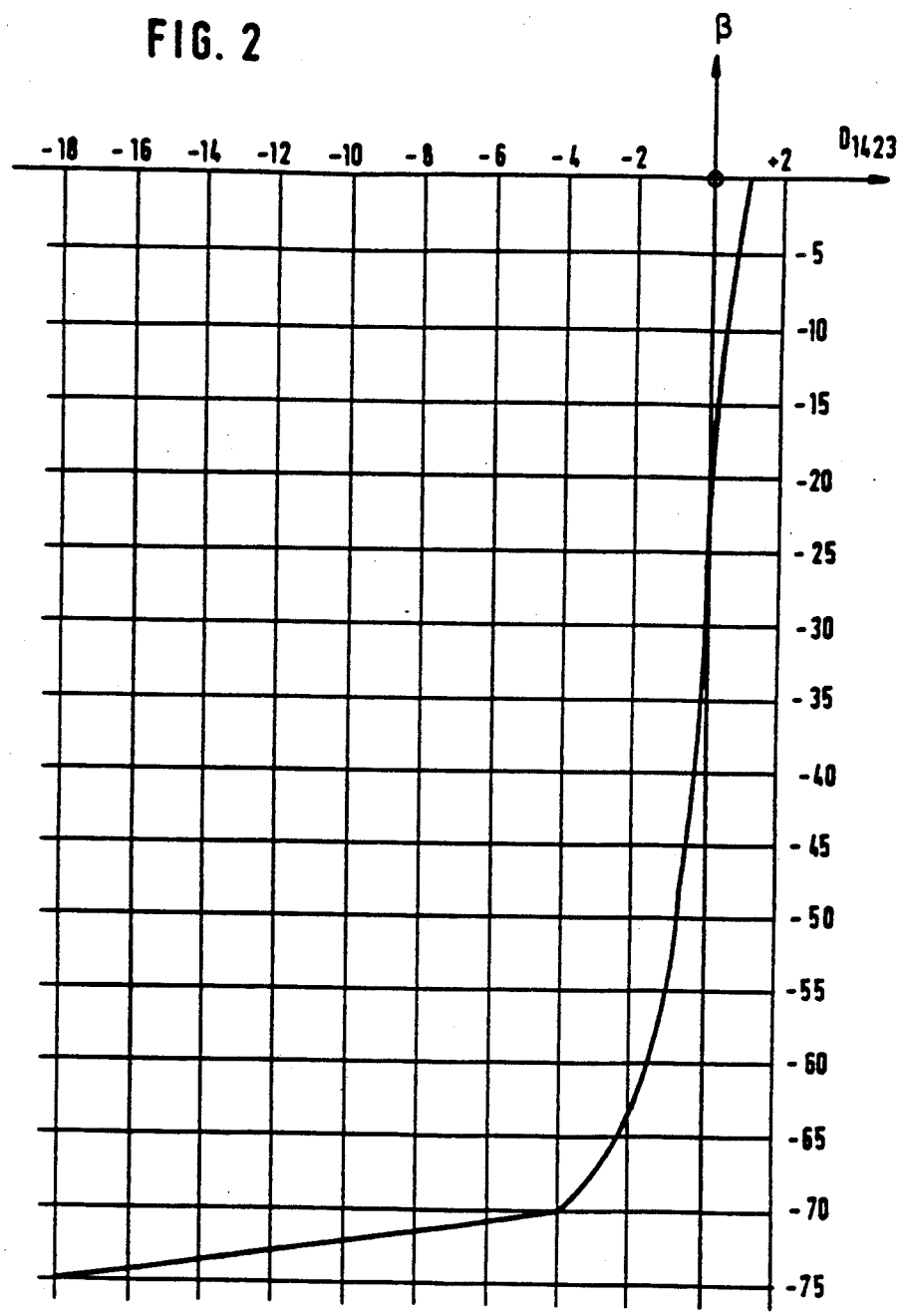
FIG. 2 is a graphic representation which reflects the angle of incidence of a cross wind relative to the vehicle as a function of a differential quotient $D_{1423}$ which can be determined from the signals of pressure probes.

A table or the like is stored by the computer 11 which makes it possible for the computer 11 to assign an angle of incidence to any possible value of $D_{1423}$. In FIG. 2, this table is shown as a diagram, in which case, the possible values of $D_{1423}$ are entered on the abscissa, and the pertaining values of the angle of incidence are entered on the ordinate. Because of the above-described arrangement of the pressure probes 1 to 6 or 1 to 4, the curve reflecting the assignment between the angles of incidence and the values of $D_{1423}$ has a monotonous slope so that there is reversible uniqueness.

Thus the computer 11 has determined the angle of incidence.

Should the angle of incidence of the cross wind be located in a different sector, the respective value of the angle of incidence of the cross wind is determined in a completely analogous manner, in that, by means of additional tables stored in the computer, the respective values of the angle of incidence are assigned to the respective values of $D_{2314}$, $D_{3456}$, etc.

In the following discussion, the angle of incidence of the cross wind is again assumed to be between 0 and −75°. In this case, the ram pressure q can be determined by the multiplication of the value of the pressure differential $p_{23}$ with a coefficient $1/c_{23}$.

Figure 3:
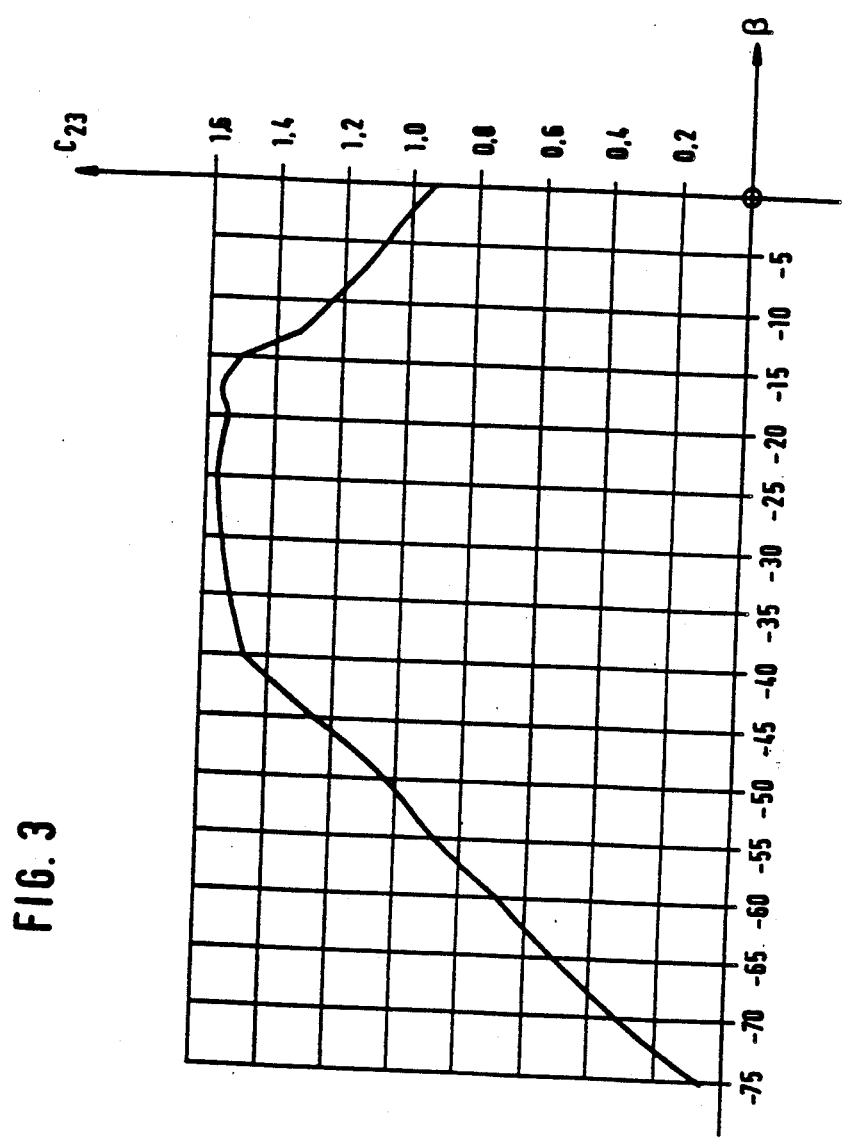
FIG. 3 is a graphic representation which reflects coefficients $c_{23}$ used for calculating the ram pressure, as a function of the angle of incidence of the cross wind.

The values of $c_{23}$ depend only on the value of the respective angle of incidence (in this case, the value range is between 0 and −75°) or the assigned values of $D_{1423}$. This is shown diagrammatically in FIG. 3. Thus, to each possible value of the approach flow, a value of $c_{23}$ can be assigned in a unique manner, so that the computer can determine the respective ram pressure q.

Basically the same applies if the angle of incidence is located in other sectors. If, for example, the angle of incidence is between 0 and +75°, the ram pressure q is determined by the multiplication of the pressure difference $p_{14}$ with the coefficient $1/c_{14}$, in which case, because of the previously determined value of the angle of incidence or of the differential quotient $D_{2314}$, $c_{14}$ can again be taken from a table.

If the angle of incidence is between +75° and +180°, the ram pressure q is calculated by the multiplication of the pressure difference $p_{56}$ with the coefficient $1/c_{56}$, in which case $c_{56}$ can again be taken from a table as a function of the previously determined value of the angle of incidence or of the differential quotient $D_{3456}$.

If finally the angle of incidence is between −75° and −180°, the ram pressure q is also obtained by the multiplication of the pressure difference $p_{56}$ with the coefficient $1/c_{56}$.

The tables or the like which assign the respective angles of incidence to the differential quotients D and, in addition, assign to the angles of incidence or the above-mentioned differential quotients D the values of c for the coefficients 1/c, are vehicle specific and must be determined beforehand empirically by means of wind channel experiments or the like.

The arrangement of the reference space 7 is important for the following reasons:

Atmospheric pressure is, at least approximately, present in the reference space 7. The pressure differences, which occur between the right side of the vehicle and the left side of the vehicle are typically at approximately 10 to 30 mbar. Since pressure probes 1 to 6 measure the pressure difference between the interior of the reference space 7 and the environment at the location of the respective probe 1 to 6, the respective measured value is in the range of between approximately −30 mbar and +30 mbar. In this case, a respective possible measuring error of approximately 1% should be taken into account, which, however, on the whole, is clearly lower than the pressure difference of the right and left vehicle side, so that a very precise determination of the angle of incidence as well as of the ram pressure may be obtained.

If, however, probes 1 to 6 were to measure the respective absolute value of the pressure in the surroundings of the probes, the actual value would in each case be in the range of approximately 1,000 mbar. A measured value of 1% would then mean a deviation of the determined value from the actual value in the amount of approximately 10 mbar. However, this measured value has the same magnitude as the pressure difference to be determined between the right and left vehicle side, so that very imprecise results would have to be expected.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. An arrangement for determining effects of cross winds on a vehicle having a plurality pressure probes spaced from one another in a longitudinal direction of the vehicle and arranged symmetrically with respect to a vertical central plane of the vehicle for generating pressure signals representative of a pressure on a body of the vehicle at a pressure probe location comprising:
   cross wind direction signal generating means for generating a wind direction signal representative of a wind direction of a cross wind relative to the vehicle, the wind direction signal being a ratio of a first difference value between pressure signals generated by a first pressure probe on a first side of the vehicle and pressure signals generated by a second pressure probe arranged asymmetrically with respect to the first pressure probe on a second side of the vehicle and a second difference value between pressure signals generated by third and fourth pressure probes which are arranged symmetrically with respect to the first and second pressure probes; and
   ram pressure signal generating means for generating a ram pressure signal representative of a ram pressure of the cross wind on the vehicle, the ram pressure signal being determined from a difference value between pressure signals generated by two pressure probes arranged asymmetrically with respect to the vertical central plane of the vehicle at different sides of the vehicle as a function of at least one of an empirically determined coefficient and said wind direction signal.

2. An arrangement according to claim 1, wherein each pressure probe is spaced interiorly from a body shell of the vehicle at an opening or bore communicating with the ambient atmosphere at a pressure probe location.

3. An arrangement according to claim 1, wherein the cross wind direction signal generating means and ram pressure generating means are a computer.

4. An arrangement according to claim 3, wherein each pressure probe is connected by conduit means to a common reference pressure space, each of the pressure probes being differential pressure gauge means for generating a pressure signal representative of a pressure difference between a pressure at a pressure probe location and a pressure of the reference pressure space.

5. An arrangement according to claim 4, wherein the reference pressure space 7 is connected with the ambient atmosphere by a throttle path means 9.

6. An arrangement according claim 4, wherein a hollow space in a body of the vehicle is connected with each pressure probe as the reference pressure space.

7. An arrangement according to claim 5, wherein a hollow space in a body of the vehicle is connected with each pressure probe as the reference pressure space.

8. An arrangement according to claim 1, wherein the pressure signals generated by each probe in the case of wind in a longitudinal direction of the vehicle, are large in value and are approximately proportional to the ram pressure (q) of the cross wind and, in the case of a constant wind velocity of the cross wind, are dependent on the wind direction of the cross wind, at least in a given angular area of cross wind directions.

9. An arrangement according claim 3, wherein the plurality of pressure probes comprises a pair of symmetrically arranged front-end pressure probes and at least one of a pair of symmetrically arranged lateral pressure probes which are arranged at a forward area of the vehicle and a combination of the pair of lateral pressure probes and an additional pair of symmetrically arranged lateral probes which are longitudinally spaced from the two lateral pressure probes.

10. An arrangement according to claim 9, wherein the additional pair of lateral probes are arranged at a central area of a side of the vehicle.

11. An arrangement according to claim 9, wherein the computer processes pressure signals generated by the pair of symmetrically arranged front-end pressure probes and by at least one of the two symmetrically arranged pairs of lateral and additional lateral pressure probes, if a difference between a pressure signal generated by a front-end pressure probe on one vehicle side and a pressure signal generated by the other front-end pressure probe has a same value sign as a difference between a pressure signal generated by one lateral pressure probe on one vehicle side and a pressure signal generated by a lateral pressure probe arranged symmetrically with respect to the one lateral pressure probe.

12. An arrangement according claim 1, wherein each pressure probe comprises a piezoresistive pressure probe.

* * * * *